US005297064A

United States Patent [19]

Bauerle

[11] Patent Number: 5,297,064

[45] Date of Patent: Mar. 22, 1994

[54] SENSOR LAG COMPENSATION

[75] Inventor: Paul A. Bauerle, De Witt, Mich.

[73] Assignee: General Motors Corporation, Detroit, Mich.

[21] Appl. No.: 678,094

[22] Filed: Apr. 1, 1991

[51] Int. Cl.[5] .......... G06F 15/20

[52] U.S. Cl. .......... 364/571.02; 364/176; 364/431.05; 364/571.04

[58] Field of Search .......... 364/176, 177, 431.05, 364/431.06, 571.02, 571.04, 571.07

[56] References Cited

U.S. PATENT DOCUMENTS

| | | | |
|---|---|---|---|
| 4,548,185 | 10/1985 | Pozniak | 123/571 |
| 4,709,334 | 11/1987 | Abe et al. | 364/431.05 |
| 4,893,244 | 1/1990 | Tang et al. | 364/431.03 |
| 5,054,451 | 10/1991 | Kushi | 364/431.05 X |
| 5,191,521 | 3/1993 | Brosilow | 364/176 X |
| 5,247,467 | 9/1993 | Nguyen et al. | 364/572 X |
| 5,249,130 | 9/1993 | Namiya et al. | 364/431.05 |

*Primary Examiner*—Edward R. Cosimano
*Attorney, Agent, or Firm*—Michael J. Bridges

[57] ABSTRACT

An algorithm, for use in automotive vehicle control systems for substantially reducing control inaccuracies caused by parameter sensing delays, predicts the present value of a sensed parameter by establishing a time history of the parameter behavior over a predetermined time period, and by extending the time history to the present time based on the dominant time constant of the parameter, the most recent sensed value of the parameter, and a calculated rate of change in the time history of the parameter.

7 Claims, 2 Drawing Sheets

SENSOR LAG COMPENSATION

FIELD OF THE INVENTION

This invention relates to a method and apparatus for approximating the present value of a sensed parameter in a automotive vehicle control system.

BACKGROUND OF THE INVENTION

Conventional control systems for automotive vehicles commonly involve means for sensing engine parameters, and a controller for reading those sensed values and for issuing control commands to the engine in accord with those sensed values. The quality of the control is constrained by, among other things, the integrity of the sensed values, i.e. the proximity of the value the sensing means provides the controller to the actual present value of the parameter.

Generally, the sensing means have some delay time associated with their response, such that by the time the sensed signal becomes available to the engine controller, the parameter may have undergone a significant change in value resulting in substantial error between the sensed value and the actual present value of the parameter, which may erode the precision of the engine control.

Prior attempts to reduce the effect of sensor lag have included the use of high speed sensors, which provide parameter information to the system controller with reduced transmission delay. This solution usually involves increased cost, and cannot completely eliminate the delay.

Parameter sensing systems have also proposed the use of future value estimating means for estimating the value of a sensed parameter at some future time, such as when an actuator is set into motion. These systems do not compensate for potentially substantial delays in the sensing means itself, and therefore provide the system controller with obsolete parameter information. Additionally, many of these systems use strictly linear approximations of the future value of the parameter, ignoring non-linear peculiarities in the parameter trajectory. Accordingly, such estimating approaches may limit the accuracy of the engine control.

Consequently, it would be desirable to provide the controller with the present value of relevant control parameters by eliminating or reducing sensor lag, without increasing system cost significantly, and without ignoring non-linearities in the parameter trajectory.

SUMMARY OF THE INVENTION

The present invention overcomes the shortcomings of the prior systems by accurately predicting what the sensor would have read had it been delay-free. This invention takes into account the known time constant of the sensed parameter, the output of the sensor, the rate of change in the output of the sensor, the sensor sample period, and related engine parameters to estimate what the value of the parameter would be with a delay free sensor.

The invention can be implemented in the form of an operating program for the engine controller using the existing engine parameter sensing means, thereby adding little cost to the system. The present value of the parameter is estimated according to a previous series of sensed values and on the present engine operating state. The invention attempts to determine typical behavior of the parameter based on predetermined relationships between the parameter and related known engine parameters. Accordingly, the invention selects a time constant based on those known parameters, and uses that time constant to estimate the present value of the subject parameter.

By taking the state of the engine and its effect on the parameter trajectory into account in this manner, this invention reduces the error between the actual present value of the parameter and the value used by the controller. Thus, a limitation on engine control accuracy is relieved with little added cost to the system.

DESCRIPTION OF THE PREFERRED EMBODIMENT

Figure 1:
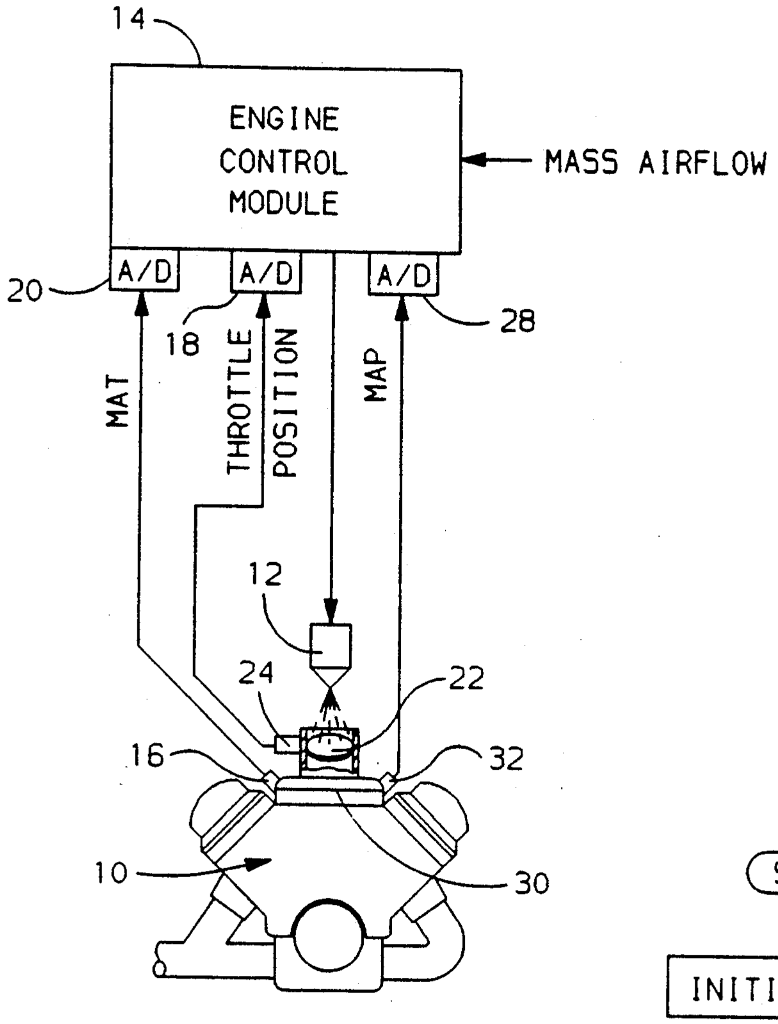
FIG. 1 illustrates an internal combustion engine and an engine control module for predicting the present value of an engine parameter in accord with the principles of this invention.

Referring to FIG. 1, fuel is supplied to an internal combustion engine 10 via a conventional fuel supply system, such as a single fuel injector 12, located above a throttle valve 22. The throttle valve may be a throttle blade rotatably associated with an air inlet of the engine 10. A common throttle position sensor 24 is associated with the throttle blade 22 so as to provide an output signal indicative of the rotary position of the blade with respect to the air inlet. This signal is transmitted to a common analog to digital converter 18, the digital output of which is transmitted to the engine control module ECM 14 to be stored in memory as throttle position.

The air inlet provides the path by which the air is ingested into an intake manifold 30, wherein a conventional manifold absolute pressure sensor 32 is located to measure the absolute pressure MAP of the air therein. This MAP value is transmitted to a common analog to digital converter 28, the digital output of which is transmitted to the ECM 14 and stored as manifold absolute pressure.

Also associated with the intake manifold 30 is a conventional temperature sensor 16 to measure the temperature MAT of the air in the manifold. This MAT value is transmitted to a common analog to digital converter 20, the digital output of which is transmitted to the ECM 14 and stored as manifold air temperature.

The mass of the air allowed into the engine may be measured using a conventional mass airflow sensor located in the inlet air path of the engine. The measured mass airflow is transmitted to the ECM 14 and is stored as mass airflow.

The engine control module ECM 14 takes the form of a standard digital computer, such as a Motorola MC68HC11 single chip microcomputer. The principles of this invention are implemented in the form of an operating program stored in the computer's memory.

Generally, the ECM, in carrying out the principles of this invention, attempts to estimate the present value of engine parameters considered to qualify as parameters capable of such estimation. To qualify as such, these parameters should be describable by means of an ascertainable dominant time constant, i.e. a measurable time constant should characterize the variation of that parameter with respect to time. The time constant need not be constant over the engine operating range, as the inventor foresees that the time constant may vary as related engine parameters vary and, as such, includes means by which a time constant may be selected from a predetermined range of values, according to the present operating state of the engine.

The use of a variable time constant insures an accurate estimation of the behavior of the subject parameter at all times. In the preferred embodiment, manifold absolute pressure is the subject parameter, although the inventor intends that this invention apply to any qualifying control parameter associated with the vehicle, such as manifold air temperature.

The estimation in accord with this invention takes into account the relationship between recent sensed values of the parameter, the sensor sample period and the variable time constant of the parameter. Accordingly, the present value, or the value of the parameter at a time when it can be made useful to the controller, is estimated. This value provides the controller with the present condition of the engine as it pertains to the parameter, and as such the control is then tailored to the present engine state. The approximation is not linear per se, but rather is an attempt to compensate for the asymptotic manner in which the sensor value approaches the actual present value of the parameter, and for ascertainable non-linearities in the parameter trajectory itself.

Figure 2:
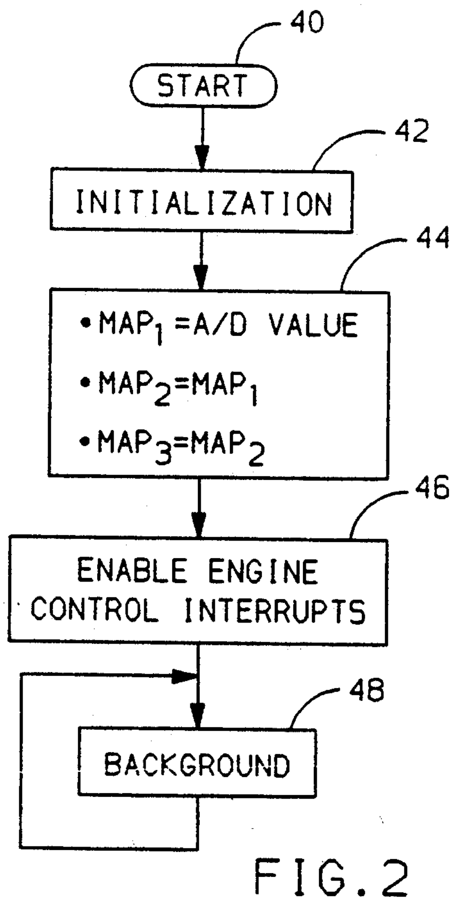
FIGS. 2 through 4 are computer flow diagrams illustrating the operation of the controller of FIG. 1 in accord with carrying out the principles of this invention.

Referring to FIG. 2, when power is first applied to the system, such as when the vehicle ignition switch is turned to its "on" position, the ECM initiates the engine control program at step 40 and proceeds to step 42 where the ECM provides for system initialization. For example, at this step data constants are transferred from ROM locations to RAM locations and counters, pointers and flags are initialized.

A specific initialization step is then executed at step 44. This part of the initialization is illustrated as it is required for carrying out the principles of this invention in this embodiment. At this step, the manifold absolute pressure is sensed and the sensed value is converted by means of a conventional analog to digital converter 28. The converted value is stored in three locations: $MAP_1$, $MAP_2$, and $MAP_3$. These three locations are later used to determine the behavior of the sensed MAP value in order to estimate its present value in accord with the principles of this invention.

$MAP_1$ is the name given to the most recent sensed MAP value. $MAP_2$ is the name given to the second most recent sensed MAP value. $MAP_3$ is the name given to the third most recent sensed MAP value. At this initialization step 44, these three variables are assigned the only available sensed MAP value. They will be updated in accord with their above described value when that value later becomes available.

After these three variables are initialized, the ECM proceeds to step 46, where interrupts used in engine control and diagnostics are enabled, such that they will occur at the appropriate time and will be serviced by the appropriate interrupt service routine. In this embodiment, the interrupt used to initiate the routine incorporating the principles of this invention is enabled at this step to occur every 6.25 milliseconds.

After the interrupts are enabled, the ECM proceeds to a background loop at step 48 which is continuously repeated while the system is operating. This loop may include system diagnostic and maintenance routines. This loop is interrupted by the interrupt routines at their specified times to execute engine control and diagnostic routines.

Figure 3:
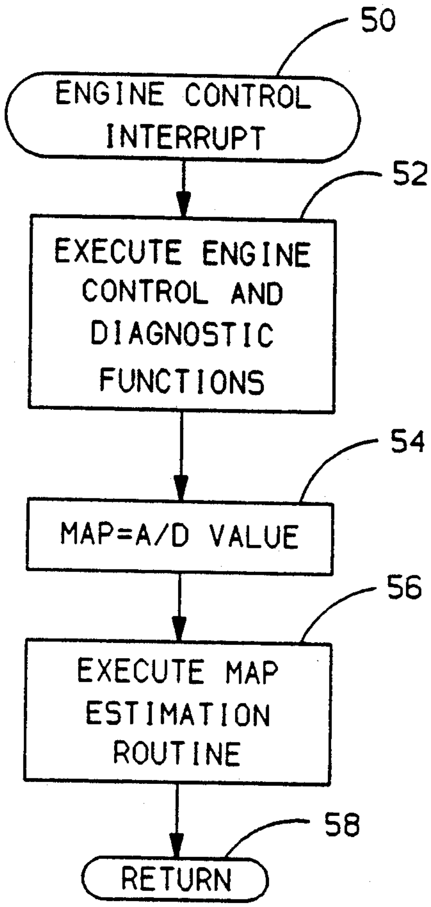

The interrupt service routine incorporating the principles of this invention is illustrated in FIG. 3, and is entered at step 50. The ECM then proceeds to step 52, where any engine control and diagnostic routines also resident in the interrupt service routine may be executed. Next, the ECM moves to step 54, where the manifold absolute pressure MAP value is read from the associated analog to digital converter 28. This value is stored in the engine control module ECM memory as MAP.

Figure 4:
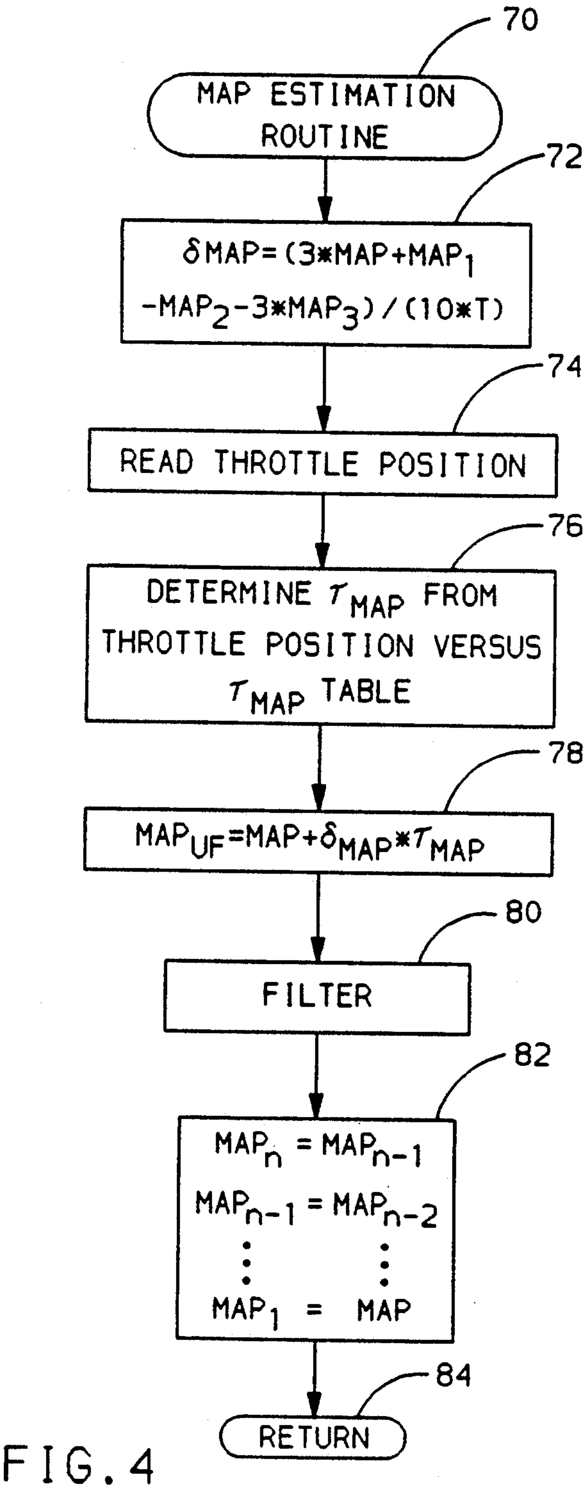

Next, at step 56, the ECM calls the specific parameter estimation routine incorporating the principles of this invention, illustrated in FIG. 4. In this embodiment, this routine estimates the MAP value which would correspond to a substantially delay-free MAP sensor. However, this routine may be used to predict the present value of any qualified engine parameter that can be modeled with one primary ascertainable time constant as discussed, such as manifold air temperature. The value determined by this routine is then used in engine control as the present value of the parameter, until it is superseded by a value obtained in a subsequent iteration of this routine. After executing this routine, the ECM proceeds to step 58 of FIG. 3, where it is directed to return to the background loop of FIG. 2.

The specific routine incorporating the principles of this invention is illustrated in FIG. 4, and is entered at step 70. The ECM then proceeds to step 72, where the time derivative of the sensed MAP value is estimated according to the following equation $\delta_{MAP}=(3^*MAP+MAP_1-MAP_2-3^*MAP_3)/(10^*T)$ where $\delta_{MAP}$ is the time derivative of the sensed MAP value and T is the sample period, 0.00625 seconds in this embodiment. This equation is based on the well known least mean squares approximation method, but any method capable of approximating a time derivative of an engine parameter may be used. The least squares technique was chosen in this embodiment due to its relative simplicity and its potential for accuracy.

The least mean squares approximation attempts to determine characteristics of a line from a set of given data points. The more points available to describe the line, the greater the potential for estimation accuracy. However, the complexity of the calculations and thus the processing time required also increases proportionally with the number of data points, such that the throughput capability of the processing system used and the amount of time available to process the least squares equation can limit the attainable accuracy.

In this embodiment, four data points are used to determine a sufficiently accurate estimation of the rate of variation of MAP. The accuracy involved has been shown to provide a sufficiently accurate present value of MAP, without excessive throughput burden on the processor used in this embodiment.

Some systems, with available processing capability may be able to absorb the added throughput required to reach the increased accuracy, and others may have to use fewer than four samples, due to limited processing capability. Still other systems may be excessively sensitive to signal perturbations such as noise, such that added samples are required to minimize the impact of those perturbations, and thus burden on processor throughput may only be a secondary consideration. The tradeoff between accuracy and expediency should be resolved according to the context of the application.

Next, at step 74, the throttle blade position is read from the analog to digital converter 18 associated with the throttle position sensor 24. The ECM then uses this value at step 76 to determine a time constant $\tau_{MAP}$ that can describe the rate of variation of the manifold absolute pressure. The time constant is related to the throttle position in that for larger throttle openings, the manifold can fill more rapidly, speeding up the response of MAP, and thereby decreasing $\tau_{MAP}$. Conversely, as the throttle opening decreases in size, the response slows, and $\tau_{MAP}$ increases.

In this embodiment, this relationship was calibrated off-line for the given throttle body and intake manifold. The information from the calibration may be stored in ECM memory, such as by a two dimensional piecewise linear model of the relationship between throttle position and $\tau_{MAP}$, stored in the form of a look-up table. Other means of determining a time constant for the given engine operating state are contemplated by the inventor, for example by calibrating $\tau_{MAP}$ as a function of mass airflow into the system, and developing a model of that relationship that can be referenced after sensing the present mass airflow into the engine using a conventional mass airflow sensor.

Other parameters that may be sensed within the scope of this invention may also have time constants that vary appreciably during an operating cycle, and furthermore, the variations may similarly be related to other parameters. In such cases, the inventor envisions that compensation for the variations take place in a manner similar to the compensation in the preferred embodiment, so as to maintain an accurate model of the behavior of the subject parameter at all times.

Returning to FIG. 4, the ECM after determining $\tau_{MAP}$, proceeds to step 78, where the present unfiltered value of MAP is calculated according to the following equation $$MAP_{UF}=MAP+\delta_{MAP}{}^{*}\tau_{MAP}$$

where $MAP_{UF}$ is the unfiltered manifold absolute pressure value. This equation is a first order approximation of the response of the MAP value, reconstructed from the predictable asymptotic response of the sensor, using the time derivative of the sensed MAP value $\delta_{MAP}$ calculated at step 72, and the applicable time constant $\tau_{MAP}$ determined at step 76.

The equation, using the appropriate time constant, compensates for the asymptotic approach of the sensor value to the present value of the parameter. Accordingly, the present value of the parameter can be accurately estimated for the present engine operating state. The control inaccuracies which result from sensor lag are thereby reduced, as are the effects of signal transients.

Returning to FIG. 4, the ECM, after calculating the unfiltered present value of MAP at step 78, proceeds to step 80, where the unfiltered value is passed through a conventional lag filter to further reduce undesirable noise. The lag filter may have a user selectable filter coefficient which dictates the amount of lag the filter will introduce into the signal. The user should select a coefficient large enough to reduce the noise in the signal to a level acceptable in the application, but should not select a coefficient so large that the lag reducing benefits of this invention are substantially diminished. The result of this filtration is an accurate estimation of the present value of the subject engine parameter, MAP in this embodiment, with reduced signal noise.

The ECM then, at step 82, updates the past MAP values for the next estimation of the slope of the MAP versus time relationship, as follows $$\begin{aligned} MAP_n &= MAP_{n-1} \\ MAP_{n-1} &= MAP_{n-2} \\ &\vdots \\ MAP_1 &= MAP \end{aligned}$$

where n is the number of samples used in step 72 to estimate the rate of variation of MAP over time. In this embodiment, n is chosen as three, but greater values may be chosen to increase the accuracy of the estimation. As discussed, such choices should be traded off against the increase in processing time.

Continuing with FIG. 4, the ECM then proceeds to step 84, where it is directed to return to the general interrupt routine of FIG. 3.

The foregoing description of a preferred embodiment for the purposes of explaining the principles of this invention is not to be considered as limiting or restricting this invention since many modifications may be made by the exercise of skill in the art without departing from the scope of this invention.

The embodiments of the invention in which an exclusive property or privilege is claimed are defined as follows:

1. A method for approximation of a present value of a measured automotive control parameter, variations in the value of said parameter being substantially describable by means of a dominant time constant, comprising the steps of:

sensing the value of the parameter;

estimating the rate of variation of the parameter;

approximating the dominant time constant of the parameter; and determining the present value of said parameter, based on the sensed value, the rate of variation of the sensed value, and the dominant time constant of the parameter.

2. The method of claim 1, wherein said step of estimating the rate of variation of the parameter further comprises the steps of:

storing a predetermined number of the most recent sensed values of the parameter; and estimating the rate of change of the first order relationship between said most recent sensed values.

3. The method of claim 1, wherein said step of approximating the dominant time constant further comprises the steps of:

sensing predetermined factors that substantially affect the value of the time constant; and approximating the value of the time constant based on said sensed predetermined factors.

4. An apparatus for approximation of a present value of a measured automotive control parameter, variations in the value of said parameter being substantially describable by means of a dominant time constant, comprising:

sensing means for sensing the value of the parameter;

rate of variation estimating means for estimating the rate of variation of the parameter;

means for approximating the dominant time constant of the parameter; and present value determining means for determining the present value of said parameter, based on the sensed value, the rate of variation of the sensed value, and the dominant time constant of the parameter.

5. The apparatus of claim 4, wherein said rate of variation estimation means further comprises:

storing means for storing a predetermined number of the most recent sensed values of the parameter; and rate of variation estimating means for estimating the rate of variation of the first order relationship between said most recent sensed values.

6. The apparatus of claim 4, wherein said means for approximating the dominant time constant further comprises:

sensing means for sensing predetermined factors that substantially affect the value of the time constant; and means for approximating the value of the time constant based on said sensed predetermined factors.

7. An apparatus for approximation of a present value of engine manifold absolute pressure comprising:

sensing means for sensing the value of engine manifold absolute pressure;

rate of variation estimating means for estimating the rate of variation of manifold absolute pressure, comprising (a) means for storing a predetermined number of the most recent sensed values of manifold absolute pressure, (b) means for estimating the first order relationship between said stored values, and (c) means for determining the rate of change in the value of said first order relationship;

means for approximating the present value of the dominant time constant of the manifold absolute pressure, comprising (a) means for sensing engine throttle position, and (b) means for approximating the present value of the dominant time constant based on said sensed engine throttle position; and present value determining means for determining the present value of engine manifold absolute pressure by summing the sensed value of engine manifold absolute pressure and a value based on the rate of change in the value of said first order relationship and the present value of the dominant time constant.

* * * * *